United States Patent Office 3,502,365
Patented Mar. 24, 1970

3,502,365
APPARATUS FOR COUPLING TOGETHER CARGO CONTAINER HANDLING SPREADERS
John Frederick Callow, Tuart Hill, Western Australia, Australia, assignor to Vickers Hoskins Pty. Limited, Ashfield, Western Australia, Australia, a corporation of Western Australia, Australia
Filed May 14, 1968, Ser. No. 730,215
Int. Cl. B66c 1/10
U.S. Cl. 294—81                                    15 Claims

ABSTRACT OF THE DISCLOSURE

Apparatus for coupling together two or more cargo container handling spreaders during loading and unloading. The cargo containers are each suspended from an individual spreader, each spreader being independently supported from lifting apparatus. The lifting apparatus is adapted to raise and lower the independently suspended spreaders together for simultaneous loading and unloading of the containers engaged by the spreaders. A coupling unit is adapted to part its connection between adjacent spreaders in response to objects, such as support structures, passing between the adjacent spreaders. Means are incorporated in the coupling unit for varying the spacing between the spreaders when connected together.

---

This invention relates to apparatus for coupling together cargo container handling spreaders during loading and/or unloading operations.

In the handling of cargo containers the economics in time and equipment that can be obtained by handling two or more containers at the one time are fairly obvious and can be readily appreciated. However, containers when transported by ship are carried in tiers in separate cells. The bracing structure between adjacent cells make it impossible to use a fixed multiple spreader to handle two or more containers into adjacent cells at the one time. Also the spacing between cells may vary and it may be desirable to set the containers down in a storage area or on a rail or road transport at a different spacing to that of the ship cells.

It is therefore an object of the present invention to provide suitable means for connecting together two or more spreaders, each of which may be attached to one or more containers, in such a way that on the containers entering the cells the spreaders are automatically uncoupled from each other so that they can descend into the cells. It is also an object of the invention to incorporate in the coupling unit means whereby the spacing between adjacent spreaders can be varied within reasonable limits as required.

Broadly the invention resides in apparatus for coupling together two or more cargo containers in spaced relationship during loading and/or unloading operations comprising a plurality of handling spreaders each adapted to engage one of the cargo containers and a connecting member adapted to co-operate with adjacent pairs of said handling spreaders so as to maintain the desired spatial relationship between the containers.

In another form the invention resides in apparatus for coupling together two or more cargo containers in spaced relationship during loading and/or unloading operations comprising a plurality of handling spreaders each adapted to engage one of the cargo containers and a connecting member detachably engaging each pair of adjacent handling spreaders so as to maintain the desired spatial relationship between the containers, said connecting member being disengaged from said spreaders when an obstruction passes between adjacent spreaders.

More particularly, the invention resides in apparatus for coupling together two or more container handling spreaders in spaced relationship during loading and/or unloading operations comprising a connecting member for each pair of adjacent spreaders each connecting member being provided with a plurality of spaced downwardly projecting legs and first and second latching units mounted one on the end of each spreader of said pair of spreaders adjacent to the end of the other spreader of the pair, each of said latching units being provided with one or more pockets or recesses each capable of receiving one of the downwardly projecting legs such that when said legs are located within said pockets of recesses, relative horizontal movement between the spreaders is prevented, said connecting member being further provided with means for engaging the top of an obstruction (such as the structure between adjacent cells into which the containers are being loaded or from which the containers are being removed) whereby said connecting member is disconnected from the pair of spreaders as the spreaders are lowered past said obstruction and is reconnected to said pair of spreaders as the spreaders are raised clear of the obstruction.

Preferably the first and second latching units are slideably mounted on the respective spreaders for movement in the plane of the spreader in a direction at right angles to the ends of the spreaders whereby the spacing between the spreaders may be varied when the connecting member is connected thereto. The sliding movement of the latching units is preferably effected by hydraulic means although it can be effected by electric or other mechanical means or manual means if desired.

The invention will be better understood by reference to the following description of one specific embodiment shown in the accompanying drawings wherein.

Figure 1:
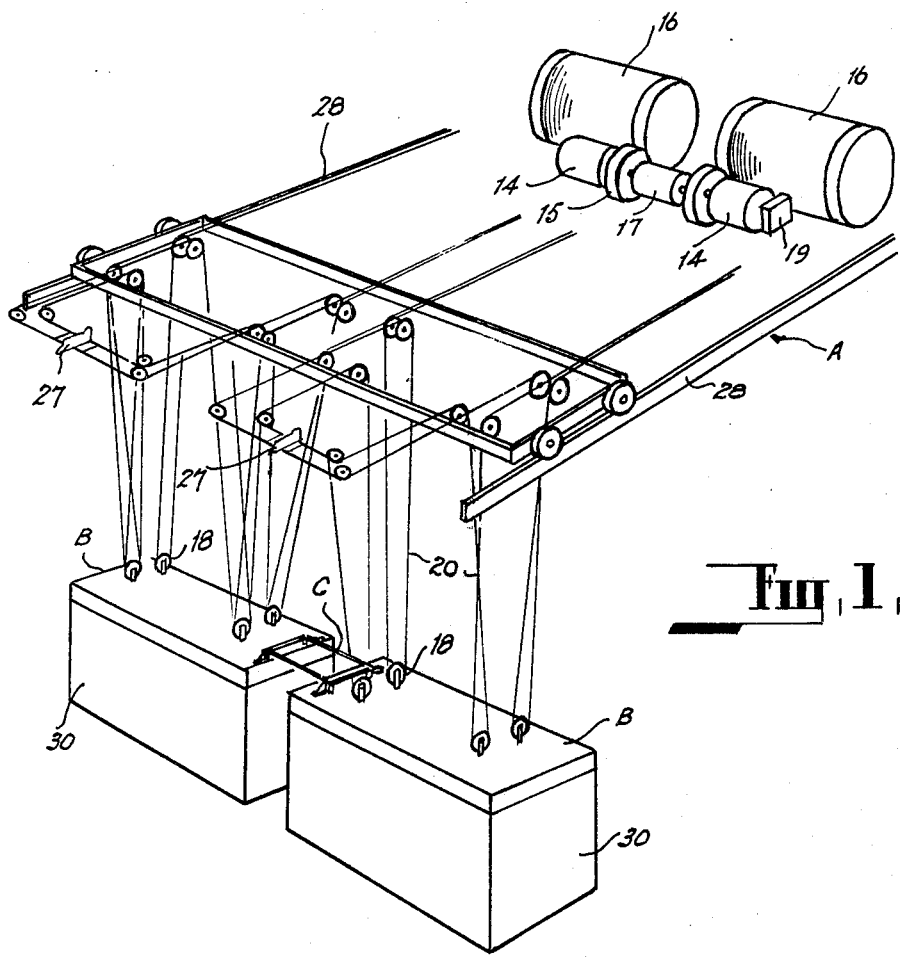
FIG. 1 is a schematic perspective view of a lifting mechanism for simultaneously raising two containers in a spaced apart relation from one position at a first spaced apart relation and depositing these same containers at a second position in a second spaced apart relation.

With specific reference to FIG. 1 lifting apparatus A dependingly supports each of two spreaders B, which spreaders are retained in spaced apart relationship by a connecting member C extending between the spreader. Lifting apparatus A comprises paired motors 14 that drive pinions 15 which mesh with gears that are connected to cable drum 16. Respective pinions 15 are intercoupled by clutch 17 so as to restrict motors 14 and drums 16 to simultaneous and equal rotation thereby affording simultaneous raising and lowering of spreaders B with cables 20 that are wound on the drums and connected to the spreaders.

Each spreader B is provided with four sheaves 18 through which cable 20 is threaded. The cable includes vertical tensional portions 20 which pass through sheaves 18 and through trolley pulleys 22 that are carried on a trolley 24. The cables are reeved around one end of the lift apparatus frame (not shown) by means of frame tie downs 27, and at the opposite end are attached to drums 16. Trolley 24 rides on frame rails 28 which are supported overhead by framework that forms no part of the present invention and is not shown. As is apparent, drums 16 are rotated to effect simultaneous vertical movement of spreaders B by taking up or letting out cables 20 while the horizontal position of the spreaders is varied along the length of rails 28 by moving trolley 24 therealong.

Lifting apparatus A, in raising and lowering paired spreaders B, operates such spreaders together to maintain simultaneous vertical movement within the same horizontal plane when clutch 17 intercouples respective pinions 17. While such co-planar simultaneous vertical movement is necessary between paired spreaders B to utilize connecting member C, it is important to note that lifting apparatus A has the advantage of permitting either of the paired spreaders B of being operated independently of the remaining spreader. Such independent operation is achieved by disengaging clutch 17 so as to uncouple pinions 15. Thereafter, one spreader B is raised to a non-obstructing position by rotation of its coupled driving motor 14 and locked in such position through its respective attached brake 19. The remaining spreader B can then be operated in the conventional manner, it being understood that connecting member C is located in a position of non-interference with respect to both the operated spreader B and support members passing adjacent the operated spreader.

The apparatus described to this point operates to lower spreaders B to an immediate overlying position with respect to a pair of cargo articles or containers 30. The spreaders are provided with conventional container gripping devices that are formed to engage mating parts on the containers. Thus, actuation of motors 14 rotates drums 16 so as to raise the depending spreaders and containers engaged thereby. Vertical movement is effected by rotation of drum 16 in an appropriate direction; horizontal movement is effected by positioning trolley 24 along rails 28.

Figure 2:
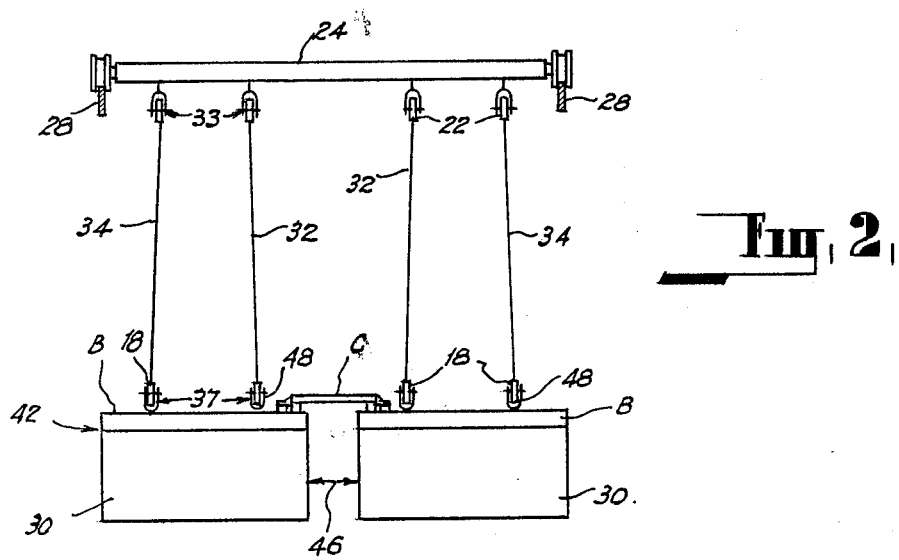
FIG. 2 is a front elevation view of two spaced apart containers illustrating the relative positions of the containers, spreaders, connecting member and trolley of the lifting mechanism.

The connecting member C is shown schematically in FIG. 2 in the form of a frame which opposes the tendency of independent horizontal movement of each of the spreaders. As is apparent, variation of the point of coupling between the connecting member and the spreader will effect a variation in the spatial separation 46 between the adjoining spreaders.

Figure 6:
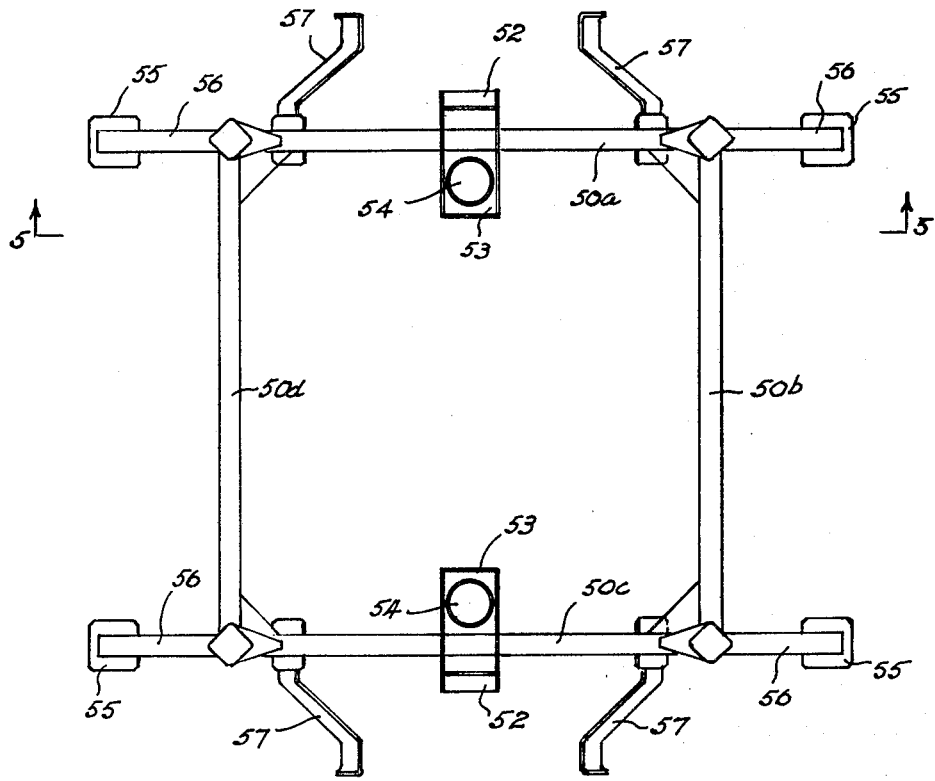
FIG. 6 is a plan view of the connecting member.
Figure 5:
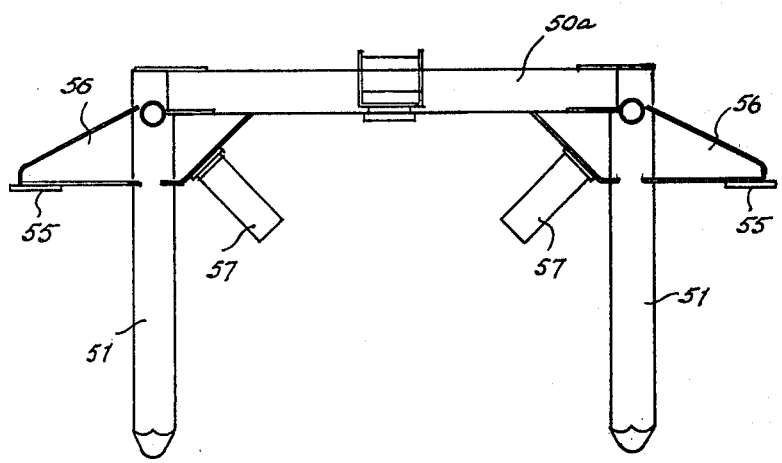
FIG. 5 is an elevation of the connecting member.

The connecting member C is shown in detail in FIGS. 5 and 6 of the drawings and comprises a substantially rectangular frame formed from members 50a, 50b, 50c and 50d provided at each corner with a downwardly projecting leg 51. A block of rubber 52 forming a buffer is fixed to the underside of one end of a transverse plate 53 centrally fixed on the longitudinal frame members 50a and 50c. The other end of the plate 53 is provided with a locating opening 54. Bearing plates 55 are mounted on the outer end of arms 56 projecting longitudinally from each corner of the frame. Locating fingers 57 project laterally and downwardly from adjacent each corner of the frame.

Figure 3:
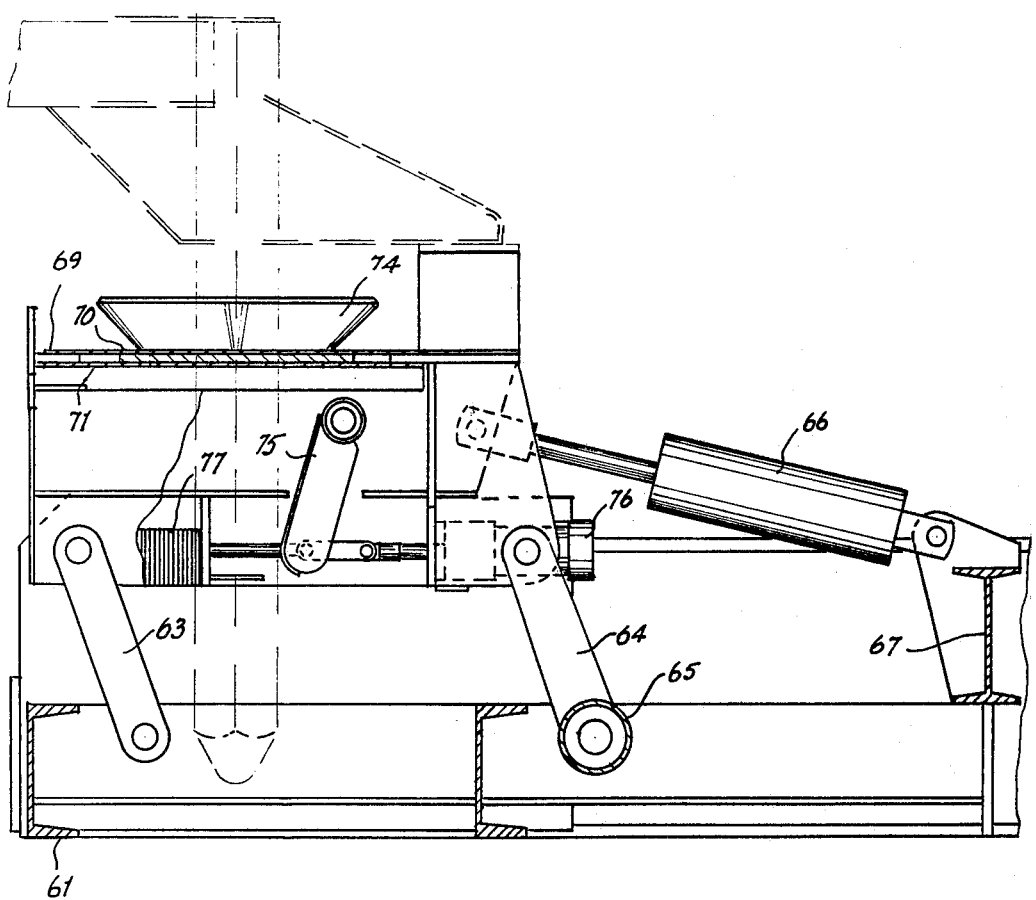
FIG. 3 is a sectional elevation of one end of a spreader fitted with a latching unit in accordance with the invention.
Figure 4:
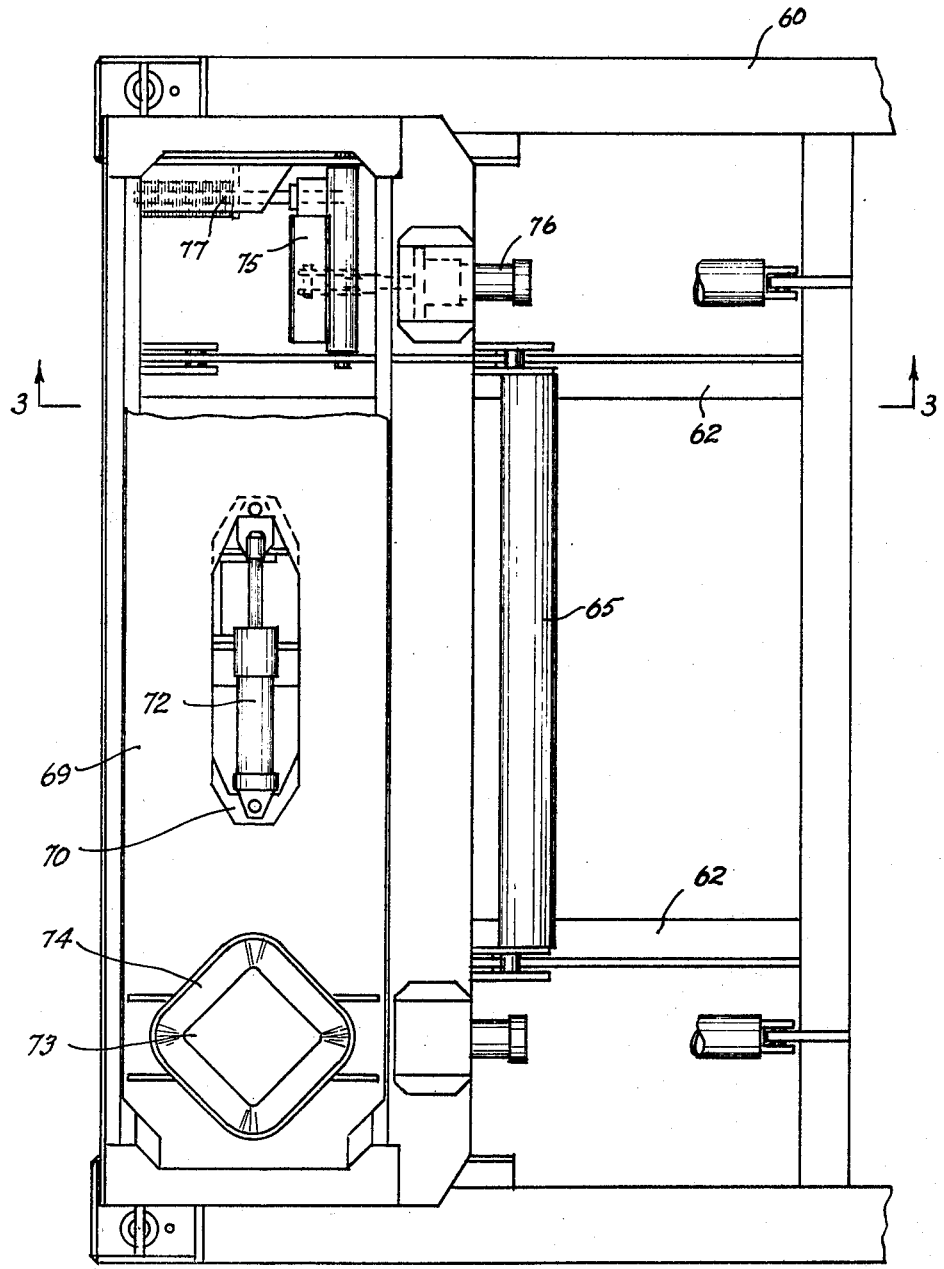
FIG. 4 is a plan view partly sectioned also showing one end of a spreader fitted with a latching unit in accordance with the invention.

The latching unit is shown in FIGS. 3 and 4 of the drawings, and is mounted on one end of the spreader, the frame of which comprises longitudinal members 60 and end members 61. The latching unit assembly is slidably mounted on longitudinal slides 62 mounted on the spreader. The latching unit assembly is pivotally connected to the upper ends of links 63 and 64 the lower ends of which are pivotally connected to the spreader frame, the lower ends of the links 64 being connected by a torsion member 65 so that they move in unison. One end of a hydraulic ram 66 is pivotally connected to the latching unit assembly, the other end of the ram 66 is pivotally connected to a transverse member 67 of the spreader frame. By operation of the ram 66 the latching unit assembly can be moved back and forth in the plane of the spreader in the longitudinal direction i.e. at right angles to the end of the spreader. The latching unit assembly comprises a frame 68 in which plates 69, 70 and 71 stacked one above the other are slidably mounted. The intermediate plate 70 is located between the two outer plates 69 and 71 and each are provided with a substantially central opening or slot in which a double acting hydraulic ram 72 is positioned. One end of the ram 72 is connected to the outer plates 69 and 71 whilst the other end of the ram is connected to the intermediate plate 70. Each of the plates is provided with substantially aligned openings 73 adjacent each end, the spacing between said openings 73 corresponding to the spacing between the legs 51 of the connecting member. The openings 73 in the uppermost plate 69 are surrounded by an inwardly and downwardly converging guide 74. The openings 73 correspond in shape to the cross section of the legs 51 but are somewhat larger in dimensions. A small engaging flap 75 is pivotally mounted on the underside of the lowermost plate adjacent each opening 73 for rotation about a substantially horizontal axis substantially parallel to the end of the spreader. The lower end of the flap 75 is connected to a hydraulic ram 76 and to a spring loaded rod 77 which urges it toward the engaged position. The flap 75 bears against the leg of the connecting member when positioned in the opening to prevent canting of the connecting member thereby ensuring that the legs remain substantially vertical. Also the spring loading of the flap 75 ensures that the legs are firmly held in the event that the hydraulic system fails. A sensing plate (not shown) is located below one of the openings 73 so that when an object (such as a leg of the connecting member) passes through the opening it bears against the sensing plate and actuates the rams 72 and 76. The operation of the ram 72 moves the plate 70 relative to the plates 69 and 71 so that the dimensions of the openings 73 are effectively reduced. Operation of the rams 76 moves the flaps 75 to a position where they bear against the object passed through the opening. When the object is withdrawn from the opening the sensing plate returns to its initial position thus reversing the operation of the ram 72 and rams 76. Rubber buffer blocks 78 are provided on the upper portion of the latching assembly frame to receive the bearer plates 55 on the connecting member.

In order to explain the operation of the apparatus it will be assumed that two containers standing on a wharf are to be loaded into adjacent cells on a ship, the spacing between the containers on the wharf being different to the spacing between the cells. The operator lowers two spreaders such as those identified by reference B in FIGS. 1 and 2 of the drawings and connected together by a connecting member C onto the two containers which are coupled to the spreaders in the usual way. In the coupled position each of the legs 51 are located within one of the openings 73 of the latching unit, the dimensions of the openings 73 having been reduced so that the periphery of the opening is a neat fit around the leg by operation of the ram 72. The flaps 75 also bear against the legs 51 to further steady any movement of one spreader relative to the other. If the spacing between the spreaders as they are lowered onto the containers does not correspond to the spacing between the containers the operator will actuate the rams 66. As the latching assemblies are fixed relative to each other through the connecting member C the spreaders will move apart or closer together as the case may be to achieve the desired spacing. When the containers have been lifted the operator again actuates the rams 66 to adjust the spacing between the spreaders to correspond to the spacing between the cells. If desired means may be provided for automatically varying the spacing between the spreaders when the containers are in transit from one position to another. As the containers are lowered into the cells the buffer pads 52 on the connecting member will bear against bearing plates fixed to the uppermost portion of the structure between the cells. Likewise the locating rings 54 will engage locating lugs projecting upwardly from the uppermost portion of the structure between the cells.

The correct location of the connecting member will also be assisted by the locating arms being against the tapered initial guides normally provided at the top of the cell guides to assist in the initial entry of the containers into the cell guides. Further lowering of the containers and the spreaders causes the legs 51 to be withdrawn from the openings 73 and leaves the connecting member straddling the structure between the cells. When the containers have been deposited in the cells the spreaders are raised and as they move upwardly they re-engage the connecting member. When the legs 51 have been withdrawn from the openings 73 the sensing plate operates to actuate the rams 72 and 76 to enlarge the dimensions of openings 73 and retract the flaps 75. This ensures that as the spreaders move upwardly the re-entry of legs 51 into the openings 73 is facilitated. Also the variation in the dimensions of the openings 73 enables variations in the relative positions of the containers and spreaders to be accommodated.

The construction of the latching units and the connecting member enables containers to be handled even though partially displaced from the correct relative positions through vertical displacement, longitudinal displacement, angular displacement, parallel misalignment or angular misalignment.

Whilst the invention has been described with particular reference to one specific embodiment it is not limited thereto. Many modifications are possible. For example, the legs may be mounted on the spreader so that they project upwardly therefrom and engage openings or recesses formed in the connecting member. Also the connecting member may be in the form of a plate in place of the rectangular frame.

We claim:

1. Apparatus for coupling together two or more container handling spreaders in spaced relationship during loading or unloading operations of said container in adjacent cells, comprising a connecting member for each pair of adjacent spreaders, each connecting member being provided with a plurality of spaced downwardly projecting legs and first and second latching units mounted one on the end of each spreader of said pair of spreaders adjacent to the end of the other spreader of the pair, each of said latching units being provided with one or more pockets or recesses each capable of receiving one of the downwardly projecting legs such that when said legs are located within said pockets or recesses, relative horizontal movement between the spreaders is prevented, said connecting member being further provided with means for engaging the top of an obstruction located between said adjacent cells whereby said connecting member is disconnected from the pair of spreaders to a position completely free of said connecting means as the spreaders are lowered past said obstruction and is reconnected to said pair of spreaders as the spreaders are raised clear of the obstruction.

2. Apparatus as claimed in claim 1 wherein the first and second latching units are slidably mounted on the respective spreaders for movement in the plane of the spreader in a direction at right angles to the ends of the spreaders whereby the spacing between the spreaders may be varied when the connecting member is connected thereto.

3. Apparatus as claimed in claim 1 wherein each latching unit is connected to the frame of the respective spreader by means of parallel links and a hydraulic ram is connected between said latching unit and said frame.

4. Apparatus as claimed in claim 1 wherein each latching unit comprises a frame, three plates positioned one above the other and slidably mounted in the frame, said plates being provided adjacent each end with substantially aligned openings which form the pockets or recesses and means for effecting relative movement between the intermediate plate and the two outer plates to effectively reduce the dimensions of said openings.

5. Apparatus as claimed in claim 4 wherein the means for effecting relative movement between the intermediate plates and the two outer plates comprises a hydraulic ram located with substantially aligned central slots in the plate. One end of said ram being connected to the intermediate plate and the other end of the ram being connected to the two outer plates.

6. Apparatus as claimed in claim 4 wherein a downwardly and inwardly directed guide is fitted around the openings adjacent the ends of the uppermost of the three plates.

7. Apparatus as claimed in claim 4 wherein a small engaging flap is pivotally mounted on the underside of the lowermost plate adjacent each opening for rotation about an axis parallel to the plane of the spreader so as to bear against a leg of the connecting member located within the opening.

8. Apparatus as claimed in claim 7 wherein operation of the engaging flap is through a hydraulic ram.

9. Apparatus as claimed in claim 7 wherein said engaging flap is spring loaded towards the engaged position.

10. Apparatus as claimed in claim 1 wherein the connecting member is provided with locating means adapted to engage complementary locating means on the uppermost portion of said obstruction.

11. Apparatus as claimed in claim 1 wherein the connecting member comprises a substantially rectangular frame and the legs project downwardly from each corner of the frame.

12. Apparatus as claimed in claim 11 wherein a pair of opposite sides of the frame are fitted with a substantially transverse plate on one end of which is mounted a buffer and on the other end of which is provided with a circular locating opening.

13. Apparatus as claimed in claim 11 wherein arms project longitudinally from each corner of the frame, the outer ends of said arms being provided with bearer plates adapted to engage buffers on said latching units.

14. Apparatus as claimed in claim 11, wherein locating fingers project laterally and downwardly from each corner of the frame.

15. Apparatus for coupling together two or more cargo containers in spaced relationship during loading or unloading operations of said containers in adjacent cells, comprising a plurality of handling spreaders each adapted to engage one of the cargo containers, a connecting member, coupling means for detachably coupling said connecting member with each pair of adjacent handling spreaders so as to maintain the desired spatial relationship between the containers, said connecting member being provided with means for engaging the top of an obstruction located between adjacent cells, said coupling means being operable to disconnect said connecting member from the pair of spreaders to a position completely free of said connecting means as the spreaders are lowered past said obstruction, and to reconnect said connecting member to said pair of spreaders as the spreaders are raised clear of the obstruction.

References Cited

UNITED STATES PATENTS

| 1,433,993 | 10/1922 | Fitch | 294—67 |
| 1,983,053 | 12/1934 | Spiegl. | |
| 2,987,340 | 6/1961 | Mattera | 294—67 |
| 3,365,229 | 1/1968 | Hitch | 294—67 |

HARVEY C. HORNSBY, Primary Examiner

U.S. Cl. X.R.

212—14, 63; 294—67